United States Patent [19]

Chambers

[11] 4,345,694
[45] Aug. 24, 1982

[54] ANTI-SIPHONING DEVICE

[75] Inventor: George S. Chambers, High Point, N.C.

[73] Assignee: J. P. Stevens & Co., Inc., New York, N.Y.

[21] Appl. No.: 215,132

[22] Filed: Dec. 10, 1980

[51] Int. Cl.³ ............... B65D 25/02; B65D 39/12; B65D 51/16; B67C 3/00
[52] U.S. Cl. ............... 220/86 AT; 141/392; 220/86 R; 220/235; 220/367
[58] Field of Search ............... 220/86 AT, 86 R, 235, 220/236, 367; 141/348, 392; 138/40, 89, 42

[56] References Cited

U.S. PATENT DOCUMENTS

| | | | |
|---|---|---|---|
| 147,929 | 2/1874 | Gaines | 220/235 |
| 1,146,944 | 7/1915 | Middleton | 220/235 |
| 1,931,335 | 10/1933 | Terry | 220/86 AT |
| 2,064,569 | 12/1936 | Santucci | 220/236 |
| 3,667,640 | 6/1972 | Morrow | 220/235 |
| 3,872,900 | 3/1975 | Gotz | 220/86 R X |
| 3,888,381 | 6/1975 | Russell, Jr. | 220/86 AT |
| 3,920,145 | 11/1975 | McGregor et al. | 220/86 AT |
| 3,951,297 | 4/1976 | Martin | 220/86 AT |

FOREIGN PATENT DOCUMENTS 739386 10/1955 United Kingdom ......... 220/86 AT

*Primary Examiner*—Allan N. Shoap
*Attorney, Agent, or Firm*—Leitner, Palan, Martin & Bernstein

[57] ABSTRACT

An anti-siphoning device including a fill tube having a plurality of axially and radially spaced restriction elements extending across the interior thereof and an elastomeric annulus compressed between a pair of plates, one of which is mounted to the fill tube for securing the anti-siphoning device to the interior of a fill pipe. A plurality of apertures in the fill tube will allow rapid dispension of the fill liquid. A nozzle support retains an automatic fill nozzle above the restriction elements to prevent premature cut off.

14 Claims, 3 Drawing Figures

U.S. Patent    Aug. 24, 1982    4,345,694
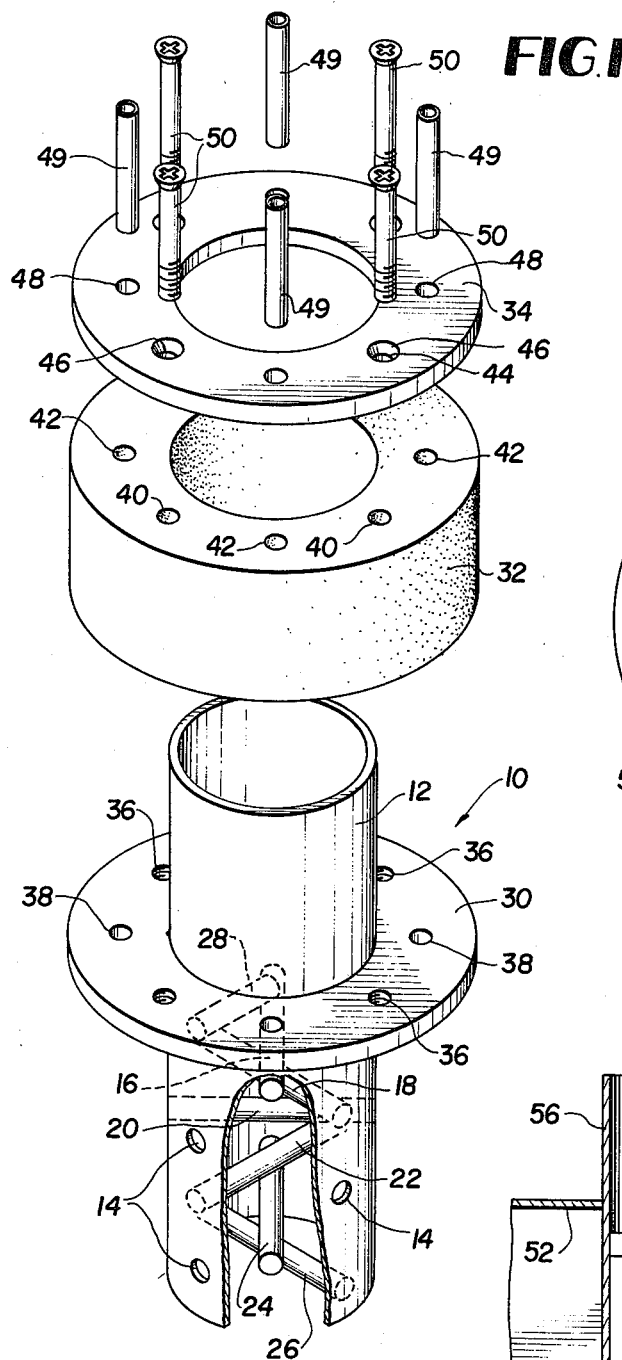
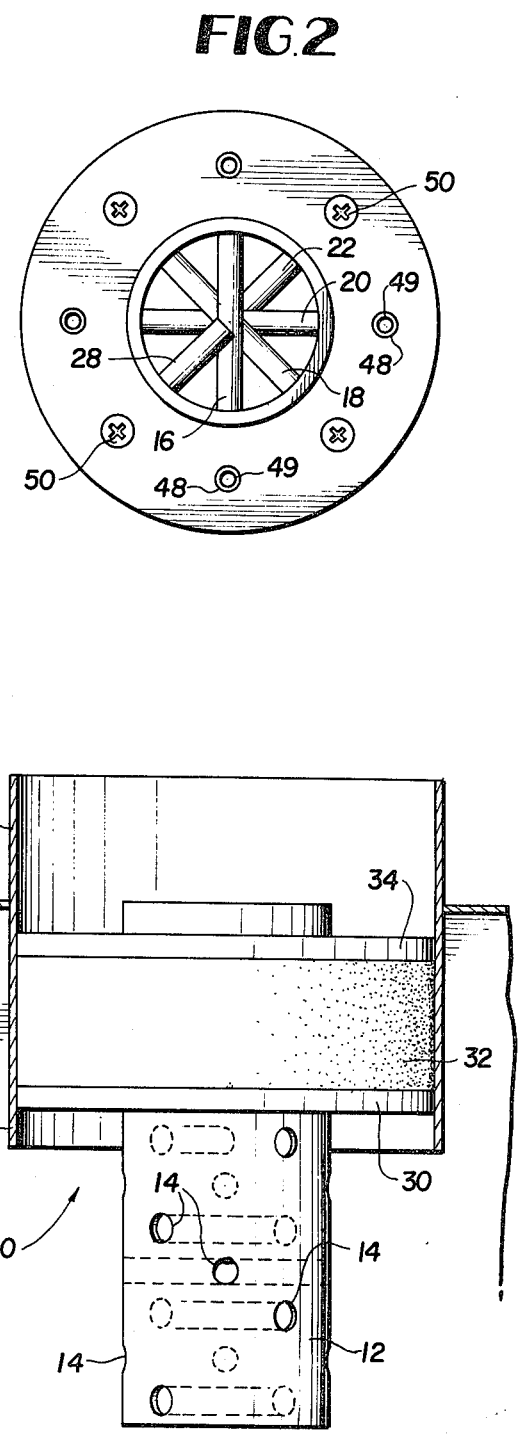
FIG.1
FIG.2
FIG.3

ANTI-SIPHONING DEVICE

BACKGROUND OF THE INVENTION

The present invention relates generally to anti-siphoning devices for fluid containers and more specifically to an improved anti-siphoning device for use in the fill pipe of a fuel tank.

With the relative scarcity and expense of fuel, the siphoning of fuel from fuel tanks has greatly increased. Efforts have been made to provide locks or other securing devices to the cap of the fill pipe. Similarly, efforts have been made to provide an anti-siphoning device within the fill pipe to prevent the insertion of a tube into the tank such that fuel may be siphoned therefrom. A relatively expensive anti-siphoning device is illustrated in British Specification No. 739,386 having a fill tube closed at the bottom and secured to the fill pipe of the tank by a collar which includes a screw engaging the interior of the fill pipe. Another anti-siphoning device is illustrated in U.S. Pat. No. 3,951,297 having the end of the fill tube substantially obstructed by a conical member. Other types of anti-siphoning devices which are inserted within the fill pipe are illustrated in U.S. Pat. Nos. 3,888,381 and 3,920,145.

In each of the devices described above, the anti-siphoning device may be defeated by inserting an elongated element like a rod in the fill tube and applying sufficient force to puncture the obstruction at the end of the fill tube of the anti-siphoning device or to totally destroy the other style of anti-siphoning devices. Similarly, the anti-siphoning devices of the prior art substantially obstruct the flow of fuel through the fill pipe or tube, thereby increasing the amount of time required to fill the tank or container. This is particularly objectionable where the dispensing device or nozzle has an automatic cut off. The obstruction retains the fuel within the fill tube or pipe adjacent the end of the nozzle which continually cuts off.

Thus, there exists a need for an anti-siphoning device which may be readily installed, may not be readily defeated, and which provides for a substantially unobstructed flow of the fuel therethrough.

SUMMARY OF THE INVENTION

An object of the present invention is to provide an anti-siphoning device which cannot be readily defeated.

Another object of the present invention is to provide an anti-siphoning device which is easily installed within the fill pipe of the container.

A still further object of the invention is to provide an anti-siphoning device which does not substantially obstruct the flow of fuel therethrough.

An even further object of the present invention is to provide an anti-siphoning device which may be used with automatic dispensing nozzles.

These and other objects of the invention are attained by an anti-siphoning device having a fill tube with a plurality of diagonal restrictions extending thereacross, spaced axially and at different radial angles to prevent the insertion of a siphoning tube while allowing substantially free flow of fuel therethrough. Apertures in the side of the fill tube also aid the free flow of fuel into the tank or container. An elastomeric annulus compressed between two annular plates, one of which is mounted to the fill tube, secures the anti-siphoning device to the interior of the fill pipe of the container. The thickness of the elastomeric annulus is sufficiently great to prevent canting or any other attempts to move the anti-siphoning device within the fill pipe. Tubular sleeves are provided in the venting orifices in the elastomeric annulus and annular plates to prevent the elastomeric from restricting the venting orifices when compressed. A nozzle support is provided above the diagonal restrictions terminating short of the center of the fill tube to support the filling nozzle above the plurality of restrictions and prevent it from automatically cutting off.

Other objects, advantages and novel features of the present invention will become apparent from the following detailed description of the invention when considered in conjunction with the accompanying drawings.

BRIEF DESCRIPTION OF THE DRAWINGS

FIG. 1 is an exploded perspective view of an anti-siphoning device incorporating the principles of the present invention.

FIG. 2 is a top view of an assembled anti-siphoning device incorporating the principles of the present invention.

FIG. 3 is a side view of an anti-siphoning device incorporating the principles of the present invention installed in a fuel tank fill pipe.

DESCRIPTION OF THE PREFERRED EMBODIMENTS

An anti-siphoning device 10 as illustrated in FIG. 1 includes a fill tube 12 having a plurality of apertures 14 in the side walls thereof. The apertures 14 are spaced along the length of the fill tube 12 as well as being spaced radially around the circumference of the tube 12. Mounted interior the fill tube 12 are a plurality of restriction elements 16, 18, 20, 22, 24 and 26. These elements are illustrated as pins or metal dowels extending diagonally across the interior of the fill tube 12 and having both ends received in apertures and welded thereto. The restriction elements each lie on a plane perpendicular to and spaced along the axis of the fill tube 12. As illustrated in FIG. 2, element 18 is positioned 90° relative to element 16, element 20 is positioned 45° relative to element 18, element 22 is positioned 90° relative to element 20, element 24 is positioned 45° relative to element 22, and element 26 is positioned 90° relative to element 24. Above the top restriction element 16 is a fill nozzle support element 28 mounted to and extending from the interior of the fill tube 12 and terminating short of the center of the fill tube 12.

In a preferred embodiment, a five inch long tube 12 having an inside diameter of one and one-half inches and an outside diameter of one and fifteen-sixteenths inches was used. The restriction elements 16 through 26 were one and fifteen-sixteenths inches long and had a diameter of approximately one-quarter of an inch. The fuel nozzle retention element 28 was approximately one inch long. The spacing between adjacent restricting elements 16 through 26 was approximately one-eighth of an inch. By selecting the fill tube 12 to be relatively thick, and welding the restriction elements 16 through 26 at both ends, the anti-siphoning device cannot be readily defeated. The thickness of the fill tube 12 and the diameter of the restriction are examples and may be reduced. Although this would result in a decreased material cost, it may also decrease the ability of the device to defeat siphoning. Similarly, the restrictions need not be secured at both ends, but this will also reduce the security of the device.

The annular relationship and the spacing of the restriction elements 16 through 26 were selected to optimize the relationship between restricting the interior of the fill tube 12 to prevent insertion of a siphon tube and the substantially unobstructed flow of fuel therethrough. With no spacing between the restriction elements 16 through 26, the fuel does not readily flow therethrough and backs up. This causes the automatic fill nozzle to cut out. The fuel nozzle support pin 28 maintains the end of the fuel nozzle well above the plurality of restriction elements 16 through 26 and thus any obstruction of the flow of fuel by the restriction elements will not rise to the height of the nozzle which is limited by the nozzle support element 28. It should be noted that the plurality of apertures 14 also increase the dispersion of the fuel through the lateral walls of the fill tube 12 and further prevent premature cutt off of the automatic nozzle.

Although the restriction elements 16 through 26 have been illustrated as lying in individual separate planes perpendicular to the axis of the fill tube 12, other orientations of the plane may be used, for example a plane inclined relative to the axis of the fill tube 12. This may cause undesirable splashing and obstruction of the fuel flow and thus cause automatic filling devices to cut out. Also, drilling holes on an angle relative to the tube 12 requires a special tool and thereby would increase the equipment needed to make the present device.

Mounted to the exterior of fill tube 12, by for example welding, is a metal annular plate 30. Positioned on the annular plate 30 is an annulus 32 of elastomeric material having substantial thickness. The elastomeric annulus 32 should be capable of not deteriorating from the fumes from the fuel. Positioned above the elastomeric annulus 32 is a top annular plate 34. The outside diameter of annular plates 30 and 34 and elastomeric annulus 32 are substantially that of a fuel tank fill pipe. The inside diameter of the annular plates 30 and 34 and the elastomeric annulus 32 are substantially that of the outside diameter of the fill tube 12. The bottom annular plate 30 includes a plurality of fastener receiving orifices 36 and venting orifices 38. The elastomeric annulus 32 includes a plurality of fastener receiving orifices 40 and venting orifices 42. The top annular plate 34 includes a plurality of fastener receiving orifices 44, counter sinks 46, and a plurality of venting orifices 48. The fastener receiving orifices 36, 40 and 44 are aligned and receive individual fasteners such as screws 50. Similarly, the venting orifices 38, 42 and 48 are also axially aligned. Tubular sleeves 49 are provided in each of the orifices 38, 42 and 48 to maintain their axial alignment and prevent the elastomeric annulus 32 from restricting the venting orifices when it is in compression. The fastener receiving orifice 36 is threaded and is smaller than the fastener receiving orifices 40 and 44 such that the bottom annular plate 30 acts as a nut for the screws 50. Although a single elastomeric annulus 32 is shown in the drawings, two or more annuli can be used.

The assembled anti-siphoning device may be installed in the fill pipe of a liquid container. As illustrated in FIG. 3, a fuel tank 52 is shown having a fill pipe 54 threaded at 56. The anti-siphoning device 10 is inserted in the fill pipe 54 and held in position. The screws 50 are rotated, pulling the top annular plate 34 down toward fixed annular plate 30. This places the elastomeric annulus 32 under compression and forces it tightly against the interior surface of the fill pipe 54. Once the anti-siphoning device 10 is securely mounted within the fill pipe 54, the heads of the illustrated screws 50 may be destroyed to prevent removal thereof. Alternatively, one-way fasteners may be used which are designed so as not to be unscrewed. The elastomeric annulus 32 is selected to have a sufficient thickness so as to prevent the anti-siphoning device 10 from being canted. This prevents someone from trying to cant, tilt or slope the holding elements 30, 32 and 34 and thereby move the anti-siphoning device 10 down into the tank. Similarly, selecting the outside diameter of annular plates 30 and 34 to be substantially that of the inside diameter of the fill pipe 54 also increases the anti-canting feature of the present device as well as preventing access to the elastomeric element 32. Since the diameter of the fill tube 12 was selected to be substantially smaller than the diameter of the fill pipe 54, the annular plates 30 and 34 and elastomeric annulus 32 would substantially block or trap the air within the fuel tank 52. Thus, the venting orifices 38, 42 and 48 must be provided.

From the preceding detailed description of the preferred embodiments, it is evident that the objects of the invention are attained in that an anti-siphoning device is provided which is readily installed, capable of being used with automatic filling nozzle, and being resistant to tampering. Although the invention has been described and illustrated in detail, it is to be clearly understood that the same is by way of illustration and example only and not to be taken by way of limitation. The spirit and scope of this invention are to be limited only by the terms of the appended claims.

What is claimed:

1. A device for preventing siphoning of a liquid from a container having a fill pipe comprising:
   a fill tube having an outside diameter smaller than the inside diameter of said fill pipe;
   a plurality of restriction means extending from the interior of said fill tube at different radial angles across the fill tube;
   a first annular plate secured to the exterior of said fill tube having an outside diameter substantially equal to the inside diameter of said fill tube;
   a second annular plate slidably received on the exterior of said fill tube having an outside diameter substantially equal to the inside diameter of said fill tube;
   an elastomeric annulus positioned on the exterior of said fill tube between said first and second annular plates and having an outside diameter substantially equal to the inside diameter of said fill tube; and
   means interconnecting said first and second annular plate for drawing said second annular plate toward said first plate to cause said elastomeric annulus to radially expand and engage the interior of said fill pipe thereby securing said device to said fill pipe.

2. The device according to claim 1 wherein each of said restriction means extend along a diameter of said fill tube and are secured at each end to said fill tube.

3. The device according to claim 2 wherein each of said restriction means lie in a different plane.

4. The device according to claim 3 wherein the plane of each of said restriction means is orthogonal to the axis of said fill tube.

5. The device according to claim 3 wherein each of said restriction means are sufficiently spaced from each other along the axis of said fill tube so as not to substantially obstruct the flow of liquid down through said fill tube.

6. The device according to claim 1 including a nozzle support means extending from the interior of said fill tube toward the center of said fill tube and terminating before the center of said fill tube for supporting an inserted liquid fill nozzle above said plurality of restriction means.

7. The device according to claim 1 wherein said fill tube includes a plurality of apertures in its side wall.

8. The device according to claim 7 wherein said apertures are spaced along the length and the circumference of said fill tube.

9. The device according to claim 1 wherein said elastomeric annulus has a sufficient thickness to prevent canting of said device in said fill pipe.

10. The device according to claim 1 wherein said first and second annular plates and said elastomeric annulus include a plurality of aligned axial orifices to allow venting.

11. The device according to claim 10 including tubular sleeve means in each of said orifices for preventing said elastomeric annulus from restricting said orifices when it is radially expanded.

12. A device for preventing siphoning of liquid from a container having a fill pipe comprising:
   a fill tube having an outside diameter smaller than the inside diameter of said fill pipe;
   means mounted to said fill tube to secure said fill tube to said fill pipe; and
   a plurality of means, each secured at both ends thereof to said fill tube and axially and radially spaced, for restricting the interior of said fill tube without substantially obstructing liquid flow therethrough, each of said restriction means lie in a distinct plane orthogonal to the axis of said fill tube and crossing the center of said fill tube.

13. The device according to claim 12 including a nozzle support means extending from the interior of said fill tube toward the center of said fill tube and terminating before the center of said fill tube for supporting an inserted liquid fill nozzle above said plurality of restriction means.

14. The device according to claim 12 wherein said fill tube includes a plurality of apertures in its side wall.

* * * * *